United States Patent
Qian et al.

(10) Patent No.: US 11,427,776 B2
(45) Date of Patent: Aug. 30, 2022

(54) METHOD FOR PRODUCING BIOFUEL

(71) Applicants: FUJITUSYO CO., LTD., Tokyo (JP); NATIONAL UNIVERSITY CORPORATION TOKYO UNIVERSITY OF AGRICULTURE & TECHNOLOGY, Tokyo (JP)

(72) Inventors: Eika W. Qian, Tokyo (JP); Toshitaka Watanabe, Tokyo (JP); Masaaki Katou, Tokyo (JP)

(73) Assignees: FUJITUSYO CO., LTD., Tokyo (JP); NATIONAL UNIVERSITY CORPORATION TOKYO UNIVERSITY OF AGRICULTURE & TECHNOLOGY, Tokyo (JP)

( * ) Notice: Subject to any disclaimer, the term of this patent is extended or adjusted under 35 U.S.C. 154(b) by 0 days.

(21) Appl. No.: 17/262,344

(22) PCT Filed: Jul. 17, 2019

(86) PCT No.: PCT/JP2019/028091
§ 371 (c)(1),
(2) Date: Jan. 22, 2021

(87) PCT Pub. No.: WO2020/022143
PCT Pub. Date: Jan. 30, 2020

(65) Prior Publication Data
US 2021/0214625 A1    Jul. 15, 2021

(30) Foreign Application Priority Data

Jul. 23, 2018  (JP) ............................ JP2018-137583

(51) Int. Cl.
*B01J 21/04*        (2006.01)
*B01J 21/12*        (2006.01)
(Continued)

(52) U.S. Cl.
CPC ............. *C10L 1/1802* (2013.01); *B01J 21/04* (2013.01); *B01J 21/066* (2013.01); *B01J 21/12* (2013.01);
(Continued)

(58) Field of Classification Search
CPC . B01J 21/02; B01J 21/04; B01J 21/066; B01J 21/12; B01J 27/053; B01J 29/041;
(Continued)

(56) References Cited

U.S. PATENT DOCUMENTS

2013/0237718 A1   9/2013  Hausmann et al.

FOREIGN PATENT DOCUMENTS

EP          2316913 A1    5/2011
JP      2011-167677 A    9/2011
(Continued)

OTHER PUBLICATIONS

KR20040087625 Bib (Year: 2004).*
(Continued)

*Primary Examiner* — Ellen M McAvoy
*Assistant Examiner* — Chantel L Graham
(74) *Attorney, Agent, or Firm* — Troutman Pepper Hamilton Sanders LLP

(57) ABSTRACT

The present invention provides a method for producing a biofuel that allows an animal/vegetable fat/oil raw material containing a free fatty acid to react with a lower alcohol in the presence of a solid acid catalyst, in which the consumption of the lower alcohol is reduced and the free fatty acid and the lower alcohol are selectively esterified to reform the animal/vegetable fat/oil.
In this method, as a solid acid catalyst is used a catalyst selected from an $SiO_2/Al_2O_3$ solid acid catalyst, an $SiO_2/Al_2O_3$ solid acid catalyst with aluminum being partially introduced into mesoporous silica, an $Al_2O_3/B_2O_3$ solid acid (Continued)

catalyst, and a sulfated zirconia solid acid catalyst, with a molar ratio of the free fatty acid and the lower alcohol of 1 to 6.

3 Claims, 1 Drawing Sheet

(51) Int. Cl.
*C10L 1/18* (2006.01)
*B01J 21/06* (2006.01)

(52) U.S. Cl.
CPC .............. *C10L 2200/0476* (2013.01); *C10L 2200/0484* (2013.01)

(58) Field of Classification Search
CPC ....... B01J 29/06; B01J 37/0018; C10L 1/026; C10L 1/1802; C10L 2200/0476; C10L 2200/0484; F25D 11/022; Y02E 50/10
See application file for complete search history.

(56) References Cited

FOREIGN PATENT DOCUMENTS

| | | | |
|---|---|---|---|
| JP | 2013-159685 A | 8/2013 | |
| JP | 2013159685 A | * 8/2013 | |
| JP | 2014-504945 A | 2/2014 | |
| KR | 10-2004-0087625 A | 10/2004 | |
| KR | 20040087625 A | * 10/2004 | |
| WO | 2004/096962 A1 | 11/2004 | |
| WO | 2009/016646 A1 | 2/2009 | |
| WO | WO-2009016646 A1 | * 2/2009 | ........... C07C 309/38 |
| WO | 2013/137286 A1 | 9/2013 | |

OTHER PUBLICATIONS

KR20040087625 Claims (Year: 2004).*
KR20040087625 Description (Year: 2004).*
JP2013159685A Bib (Year: 2013).*
JP2013159685A Claims (Year: 2013).*
JP2013159685A Description (Year: 2013).*
International Search Report issued in corresponding International Patent Application No. PCT/JP2019/028091 dated Sep. 24, 2021, with English translation.
Murayama, H., et al. "Development of catalysts for transesterification and isomerization of vegetable oil" Proceeding of Annual/Fall Meeting of the Japan Petroleum Institute, The Japan Petroleum Institute p. 117 (2016), with machine translation cited in ISR.

* cited by examiner

METHOD FOR PRODUCING BIOFUEL

CROSS REFERENCE TO RELATED APPLICATIONS

This is a U.S. National Phase Application under U.S.C. § 371 of International Patent Application No. PCT/JP2019/028091, filed Jul. 17, 2019, which claims priority of Japanese Patent Application No. 2018-137583, filed Jul. 23, 2018. The entire contents of which are hereby incorporated by reference.

TECHNICAL FIELD

The present invention relates to a method for producing a biofuel suitable for use with diesel engines from a fat/oil.

BACKGROUND

Nowadays, there exist global issues such as declining accessible oil resources, deteriorating global environment, and growing fuel demand accompanied by economic development in emergent countries.

This trend, in turn, requires the development of processes for producing clean and renewable fuels replacing fossil resources, and chemicals.

The development of biofuels and bio-based chemical products is thus expected to significantly contribute to the promotion of the domestic industries, reduction in greenhouse gas emissions, lower dependence on fossil resources, development of the regional economy, and ensured domestic energy security.

Currently, one practical biodiesel-fuel production method is to produce a fatty acid ester by transesterifying in the presence of an alkali catalyst such as potassium hydroxide or sodium hydroxide, a fat/oil containing triglyceride as a main component.

The method, however, must remove in pretreatment free fatty acids (FFAs) in large quantities present in fats/oils as a raw material, which can adversely affect the transesterification reaction, and separation or refinement of products.

Moreover, in order to preserve the global environment and reduce $CO_2$ emissions generated by fossil fuels, the focus of technological attention has been the use of fat/oil-derived fuel oils as a replacement for part or all of petroleum-derived fuel oils utilized for conventional diesel engine generation. Nonetheless, as described above, a free acid contained in a fat/oil, as a factor for corroding diesel engines, must be removed from fuel oils thereof.

On the contrary, another proposed method is to allow a triglyceride to react with a lower alcohol such as methanol or ethanol in the presence of a solid acid catalyst to transesterify the triglyceride and esterify a free fatty acid at the same time.

For example, see JP-A-H06-313183 and JP-A-2009-114289.

SUMMARY

Unfortunately, the consumption of a lower alcohol, which is used both for transesterifying and esterifying a free fatty acid in these methods, can be higher, resulting in problematic increases in operational costs.

Thus, the present invention was achieved by examining reaction conditions such that the use of a new solid acid catalyst controls the consumption of a lower alcohol to allow a triglyceride in a fat/oil to little transesterify the lower alcohol, but to allow a free fatty acid to selectively esterify with the lower alcohol.

The present invention provides a method for producing a biofuel that allows a fat/oil raw material containing a free fatty acid to react with a lower alcohol in the presence of a solid acid catalyst, in which as a solid acid catalyst is used a catalyst selected from an $SiO_2/Al_2O_3$ solid acid catalyst, an $SiO_2/Al_2O_3$ solid acid catalyst with aluminum being partially introduced into mesoporous silica, an $Al_2O_3/B_2O_3$ solid acid catalyst, and a sulfated zirconia, with a molar ratio of the free fatty acid and the lower alcohol of 1 to 4.

The solid acid catalyst used in the present invention should have an acid functionality on the surface of a solid carrier.

The material that can be used as a carrier is not specifically restricted so long as it may immobilize a functional group and the material is acid, and may itself have a predetermined functional group as surface structure.

Illustrative example of the carrier material includes cation exchange resins having an acid immobilized on the surface of a polystyrene carrier, and silica, alumina, boric oxide, zirconium, titanium, zeolite, and activated carbons having an acid group or a hydroxyl group in a surface structure thereof, and mixtures composed of combinations of two or more materials thereof.

The type of cation exchange resins and the calcination treatment temperature of silica and alumina carriers can be regulated to adjust the acid group present on the surface accordingly and change the acidity.

Furthermore, mixtures composed of combinations of these two or more materials thereof may be a carrier for illustration. In this way, in the present invention, the type of cation exchange resins and the calcination treatment temperature of carriers such as zirconia, titania, silica, alumina, and boric oxide can be regulated to adjust the acid group present on the surface accordingly and change the acidity.

Illustrative example of the functional group on the surface of a carrier includes a strong-acid sulfonate group and a functional group having a Broensted acid such as hydrogen ions or a Lewis acid capable of accepting a pair of electrons, for example.

Illustrative example of the raw oil that can be used in the present invention includes vegetable oils, animal fats/oils, and mixtures of fatty acids derived of the fats/oils and an ester.

Illustrative example of the lower alcohol includes methanol and ethanol.

With a molar ratio of a free fatty acid in a fat/oil raw oil whose content is 30% or more and a lower alcohol of 6 or less, preferably 1 to 4, the consumption of an alcohol is reduced and the free fatty acid in the raw oil is preferentially esterified from a triglyceride in the raw oil to obtain a high conversion rate of the free fatty acid.

For example, by using as a solid acid catalyst, a catalyst selected from an $SiO_2/Al_2O_3$ solid acid catalyst, a solid acid catalyst with aluminum being partially introduced into mesoporous silica, and an $Al_2O_3/B_2O_3$ solid acid catalyst, a free fatty acid in a raw oil can selectively be esterified with an alcohol to raise the conversion rate of the free fatty acid.

As for $Al_2O_3/B_2O_3$ solid acid catalysts in particular, a high conversion rate of a free fatty acid in a raw oil can be raised and the conversion rate of a triglyceride in the raw oil can be reduced.

Also, the method in the present invention can selectively esterify a free fatty acid and a lower alcohol, with a reaction temperature of 150° C. or less, preferably 150° C. to 70° C.

In addition, the reactor such as a batch-type reactor shown in FIG. 1, and a circulation-type reactor shown in FIG. 2, may be used.

The present invention can provide a biofuel suitable for use with diesel engines by preferentially esterifying a free fatty acid in a raw oil with an alcohol and raising the conversion rate of the free fatty acid to reform a fat/oil.

Furthermore, in the present invention, the consumption of the alcohol can be reduced by raising the high conversion rate of the free fatty acid in the raw oil and reducing the conversion rate of a triglyceride in the raw oil.

DETAILED DESCRIPTION OF THE DRAWINGS

In a method for producing a biofuel that allows an animal/vegetable fat/oil raw material containing a free fatty acid to react with a lower alcohol in the presence of a solid acid catalyst, as a solid acid catalyst is used a catalyst selected from an $SiO_2/Al_2O_3$ solid acid catalyst, a solid acid catalyst with aluminum being partially introduced into mesoporous silica, an $Al_2O_3/B_2O_3$ solid acid catalyst, and a sulfated zirconia solid acid catalyst, with a molar ratio of the free fatty acid and the lower alcohol of 1 to 6.

EXAMPLES

Reactor Used in the Present Invention

Figure 1:
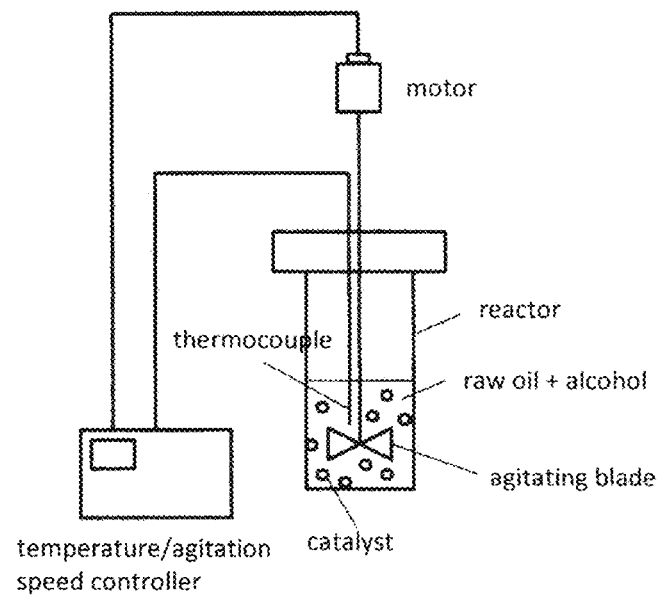
FIG. 1 is a schematic diagram of a batch-type reactor used in the present invention.

FIG. 1 is a schematic diagram of a batch-type reactor, having a heater provided on the outer circumference of a reactor vessel, the vessel containing a raw oil and an alcohol as well as a catalyst. A reaction is produced by controlling the temperature in the reactor vessel and the agitation speed of reaction samples by a controller.

Figure 2:
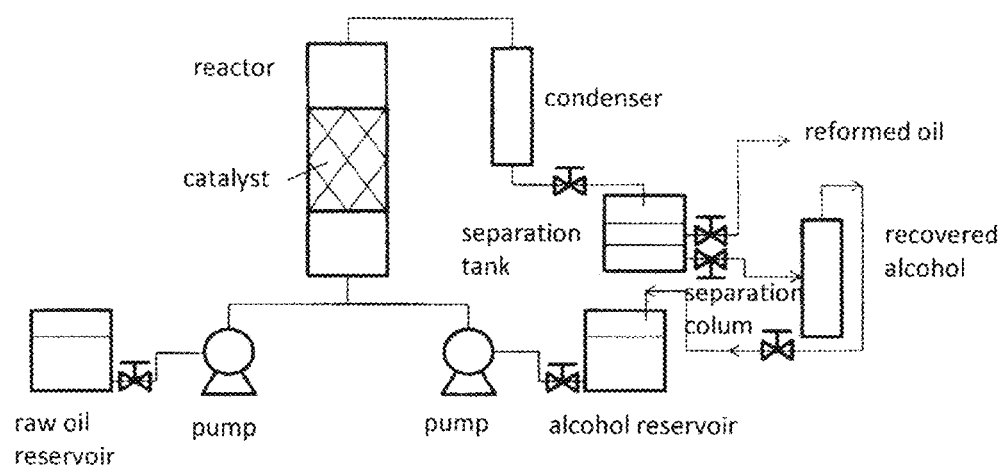
FIG. 2 is a circulation-type reactor used in the present invention.

FIG. 2 is a schematic diagram of a circulation-type reactor, having a heater provided on the outer circumference of a reactor vessel filled with a catalyst. A raw oil and an alcohol contained in each reservoir are fed into the reactor vessel by a pump and allowed to pass through a catalytic layer to produce a reaction.

A reaction liquid is depressurized through a condenser and fed into a separation tank, and reformed oil is recovered from the top of the separation tank, the lower layer is fed into a separation column, a small amount of unreacted alcohol is recovered from the top, and recovered alcohol is stored in the reservoir and fed into the reactor for another reaction.

Example of Producing a Solid Acid Catalyst Used in the Present Invention

<Aluminum-Inserted SBA-15 (Al-SBA-15 (5))>

One example of a solid acid catalyst used in the present invention is a catalyst prepared by introducing a proper amount of aluminum into mesoporous silica (SBA-15), as shown below. A polymer P123 was dissolved with hydrochloric acid and mixed with TEOS (Tetraethyl Orthosilicate). Then, to the resulting mixture was added a proper amount of hydrochloric acid solution of aluminum sulfate, neutralized with aqueous ammonia, and aluminum was introduced into the SBA-15 such that the atom ratio of aluminum and silicon is 5. Thereafter, silica crystals were grown and the polymer P123 and the like were removed by air calcination at 450° C. to obtain an aluminum-inserted SBA-15 (Al-SBA-15 (5)). With a different amount of an aluminum sulfate added, an Al-SBA-15 having a different atom ratio of aluminum and silicon is prepared.

<Sulfated Zirconia ($ZrO_2/SO_4^{2-}$)>

One example of a solid acid catalyst used in the present invention is a sulfated zirconia, as shown below. (JRC-ZRO-2 to 5) were employed as a zirconium oxide, and they were pulverized until the particle size was 32 to 50 meshes. Then, 2 g of the above zirconium oxide was collected in a conical beaker, dissolved and dispersed in a 0.5 mol/liter sulfuric acid aqueous solution, allowed to stand for one hour, and then was subjected to suction filtration for about 10 minutes to obtain a sulfated zirconia. Moreover, the sulfated zirconia obtained in the above procedures was dried at 30° C. for 24 hours and using a crucible, calcined in the air at 600° C. for 3 hours to prepare a solid acid. In addition, when nitric acid or hydrochloric acid was used in place of sulfuric acid, zirconium nitrate or zirconium hydrochloride was prepared.

Table 1 shows experimental results using a batch-type reactor.

In Table 1, the reaction time is measured by the hour, and the kinetic viscosity is measured at 40° C.

Also, Amberlyst 70 is a commercially available solid acid catalyst as a cation exchange resin shown as a comparative example.

TABLE 1

| catalyst | Reaction condition | | | | | | Properties of product oil | |
|---|---|---|---|---|---|---|---|---|
| | Methanol/FFA (molar ratio) | Raw oil/catalyst (weight ratio) | Reaction time (hr) | Rection temperature (° C.) | Reaction results | | Acid number mg KOH/g raw oil | Kinetic viscosity (mPa · s) |
| | | | | | Conversion rate 1) | Conversion rate 2) | | |
| $SiO_2/Al_2O_3$ (70:30) | 6 | 10:1 | 3 | 150 | — | 86.1 | 10.5 | 4.28 |
| | 2 | 10:1 | 6 | 150 | 39.1 | 66.8 | 25.1 | 15.2 |
| | 4 | 10:1.5 | 3 | 150 | 59.9 | 79.0 | 15.9 | 7.33 |
| $Al_2O_3/B_2O_3$ (85:15) | 2 | 10:1.5 | 3 | 150 | 29.6 | 77.3 | 17.1 | — |
| | 4 | 10:1 | 3 | 150 | 46.9 | 67.2 | 24.8 | — |
| Al-SBA-15 (5) | 4 | 10:1 | 3 | 150 | 10.0 | 76.9 | 18.5 | — |
| Amberlyst 70 | 2 | 10:1.5 | 3 | 150 | 53.5 | 10.5 | 67.6 | — |

Note 1:
Conversion rate 1) was for triglyceride in raw oil (%).
Note 2:
Conversion rate 2) was for free fatty acid (FFA) in raw oil (%).
Note 3:
Raw oil was palm acid oil (PAO) containing approx. 37.4% free fatty acid, and the acid number is 75.5 mm KOH/g raw oil, and the kinetic viscosity was 34.4 mPa · s.

As obviously shown in Table 1, as for the solid acid catalysts such as $SiO_2/Al_2O_3$ solid acid catalysts, $Al_2O_3/B_2O_3$ solid acid catalysts, and Al-SBA-15 solid acid catalysts with aluminum being partially introduced into mesoporous silica SBA-15, high conversion rates of free fatty acids in a raw oil are obtained.

As for the $Al_2O_3/B_2O_3$ solid acid catalysts, and Al-SBA-15 solid acid catalysts in particular, both the high conversion rate of free fatty acids in a raw oil and the conversion rate of a triglyceride in the raw oil can be reduced.

High conversion rates of the free fatty acids in the raw oil can be obtained by reducing the consumption of a lower alcohol, with a molar ratio of the free fatty acid and the lower alcohol of 6 or less, preferably 1 to 4.

Furthermore, a free fatty acid and a lower alcohol can selectively be esterified, with a reaction temperature of 150° C. or less, preferably 100° C. to 150° C.

Experiment by Circulation-Type Reactor $SiO_2/Al_2O_3$ solid acid catalysts with aluminum being partially introduced into mesoporous silica (Al-SBA-15) were filled in a reactor vessel of a circulation-type apparatus shown in FIG. 2, and a raw oil and a lower alcohol were fed thereinto to be esterified. Consequently, predetermined effects were obtained.

The present invention can provide a method for producing a biofuel suitable for use with diesel engines by raising the conversion rate of a free fatty acid in a raw oil to reform a fat/oil, and excellent in cost performance by reducing the conversion rate of a triglyceride in the raw oil.

The invention claimed is:

1. A method for producing a biofuel, comprising;
reacting a fat/oil containing a free fatty acid with a lower alcohol, in the presence of a solid acid catalyst, with a molar ratio of the free fatty acid and the lower alcohol is 6 or less, and
performing an esterification of the free fatty acid with the lower alcohol,
wherein the solid acid catalyst is selected from an $SiO_2/Al_2O_3$ solid acid catalyst, an $SiO_2/Al_2O_3$ solid acid catalyst with aluminum being partially introduced into mesoporous silica, and an $Al_2O_3/B_2O_3$ solid acid catalyst.

2. The method for producing a biofuel according to claim 1, wherein the molar ratio of a free fatty acid and a lower alcohol is 1 to 4.

3. The method for producing a biofuel according to claim 1, wherein a temperature of the reaction is 150° C. or less.

* * * * *